(12) United States Patent
Poblete

(10) Patent No.: US 6,615,642 B2
(45) Date of Patent: Sep. 9, 2003

(54) METHOD AND APPARATUS TO LOCALLY TEST PRESSURE SEAL

(75) Inventor: Daniel D. Poblete, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/940,120

(22) Filed: Aug. 27, 2001

(65) Prior Publication Data

US 2003/0037604 A1 Feb. 27, 2003

(51) Int. Cl.$^7$ ................................................ G01M 3/02
(52) U.S. Cl. ............................................. 73/37; 73/46
(58) Field of Search ........................... 73/37, 40, 40.7, 73/49.8, 46, 592

(56) References Cited

U.S. PATENT DOCUMENTS

| | | | | |
|---|---|---|---|---|
| 2,345,387 A | * | 3/1944 | Elsey | 73/40 |
| 2,647,399 A | * | 8/1953 | Newbill, Jr. | 73/856 |
| 2,660,053 A | * | 11/1953 | Buehner | 73/40 |
| 2,694,924 A | * | 11/1954 | Matlock | 73/37 |
| 3,203,229 A | * | 8/1965 | Pevar | 73/40 |
| 3,330,878 A | | 7/1967 | Huckins | |
| 3,748,905 A | * | 7/1973 | Fletcher et al. | 73/421.5 R |
| 4,145,915 A | * | 3/1979 | Oertle et al. | 73/37 |
| 4,406,855 A | * | 9/1983 | Schwiers et al. | 376/250 |
| RE31,898 E | * | 5/1985 | Suter | 52/2 |
| 4,603,576 A | * | 8/1986 | Spencer | 73/40 |
| 4,976,136 A | * | 12/1990 | Willan | 73/40.7 |
| 4,979,390 A | * | 12/1990 | Schupack et al. | 73/38 |
| 4,998,435 A | * | 3/1991 | Miller et al. | 73/40.7 |
| 5,111,684 A | | 5/1992 | Stauffer et al. | 73/49.3 |
| 5,182,941 A | * | 2/1993 | Frenkel et al. | 73/40 |
| 5,257,088 A | | 10/1993 | Tyson, II et al. | 356/353 |
| 5,345,813 A | * | 9/1994 | Flessas | 73/46 |
| 5,404,747 A | * | 4/1995 | Johnston et al. | 73/40 |
| 5,577,364 A | | 11/1996 | Wang et al. | 53/53 |
| 5,687,606 A | * | 11/1997 | Reilly | 73/73 |
| 5,798,696 A | * | 8/1998 | Wong | 340/605 |
| 6,050,133 A | * | 4/2000 | Achter et al. | 73/40.7 |
| 6,289,722 B1 | * | 9/2001 | Lycan et al. | 73/49.2 |
| 6,308,556 B1 | | 10/2001 | Sagi et al. | 73/40 |
| 6,393,896 B1 | * | 5/2002 | Fan | 73/40 |

FOREIGN PATENT DOCUMENTS

WO    WO 02/01175 A1    1/2002    ............ G01M/3/23

OTHER PUBLICATIONS

US patent application 2002/0002866 A1, Davey, filed Jan. 10, 2002.*
US patent application 2002/0112527 A1, Nadin, filed Aug. 22, 2002.*

* cited by examiner

Primary Examiner—Hezron Williams
Assistant Examiner—Charles D Garber
(74) Attorney, Agent, or Firm—Harness Dickey & Pierce P.L.C.

(57) ABSTRACT

A tool for conducting localized testing of the integrity of a pressure seal on an aircraft. The tool comprises a body having an exterior surface and an interior cavity. A peripheral edge on the body defines an opening to the interior cavity. The tool is positioned on an aircraft over the pressure seal to be tested with the interior cavity communicating with the pressure seal. A sealing member is positioned between the aircraft and the peripheral edge so that a fluid tight seal is formed between the tool and the aircraft. A vacuum is created in the interior cavity. After a predetermined length of time the amount of vacuum in the interior cavity is observed and the integrity of the pressure seal is determined.

13 Claims, 2 Drawing Sheets

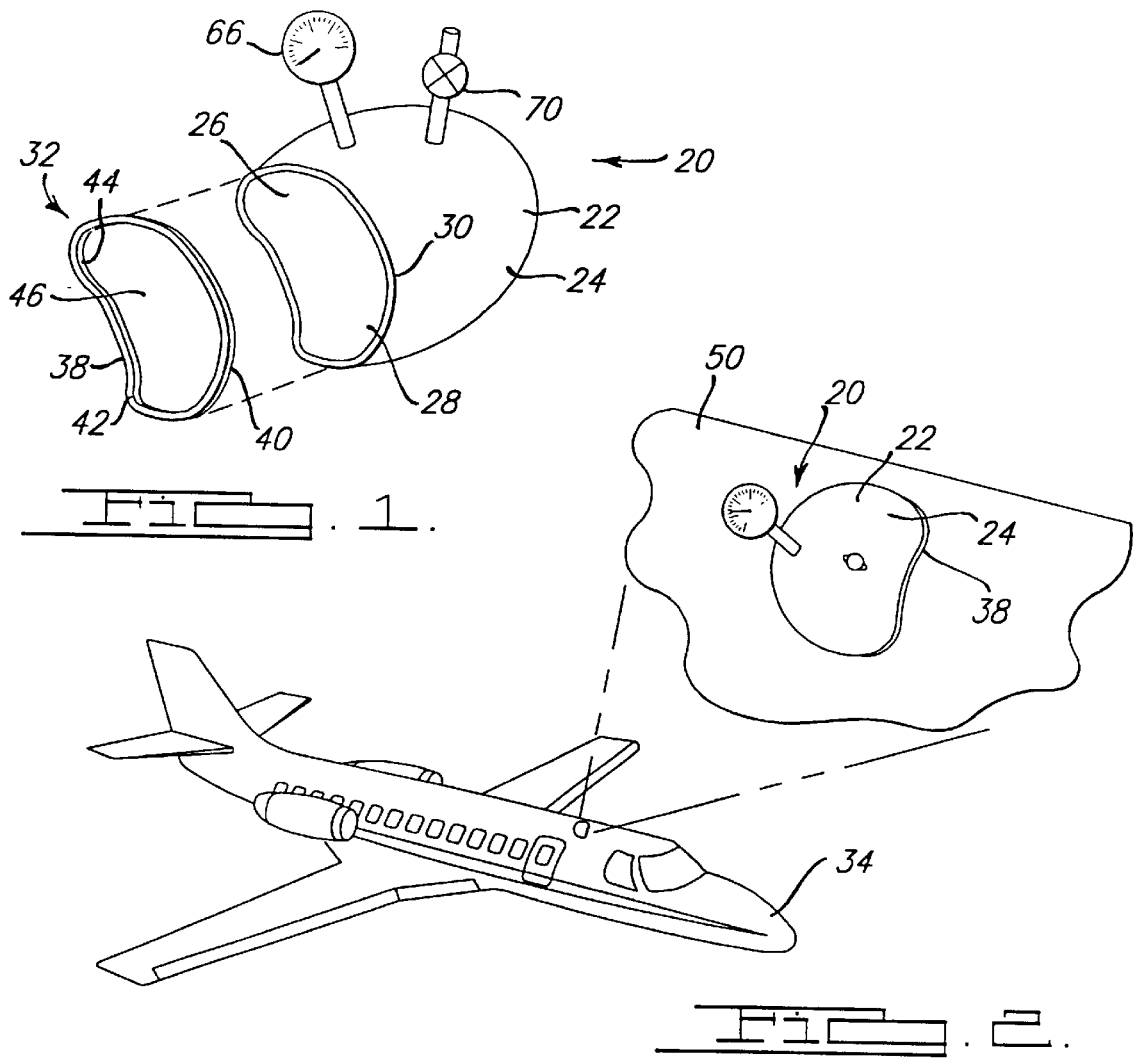
FIG. 1.
FIG. 2.
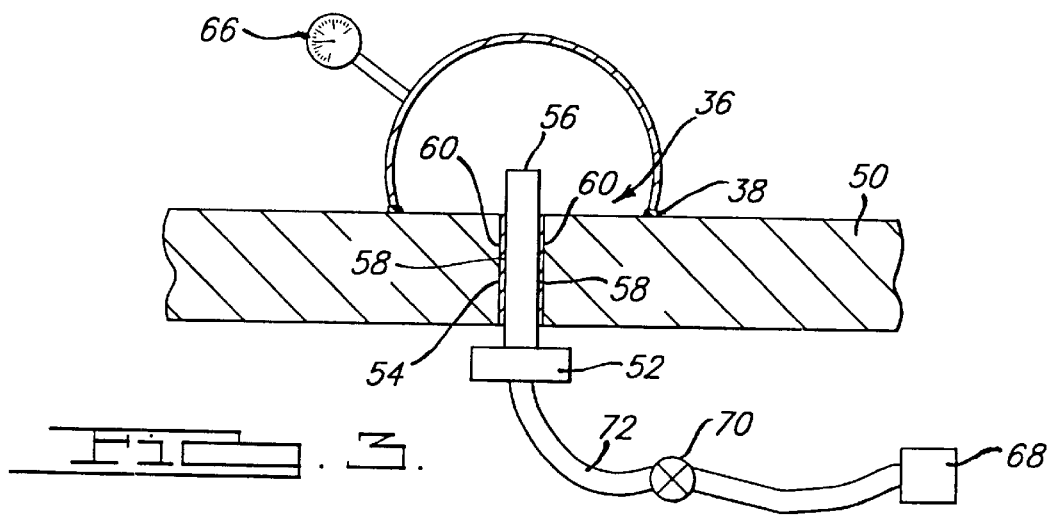
FIG. 3.

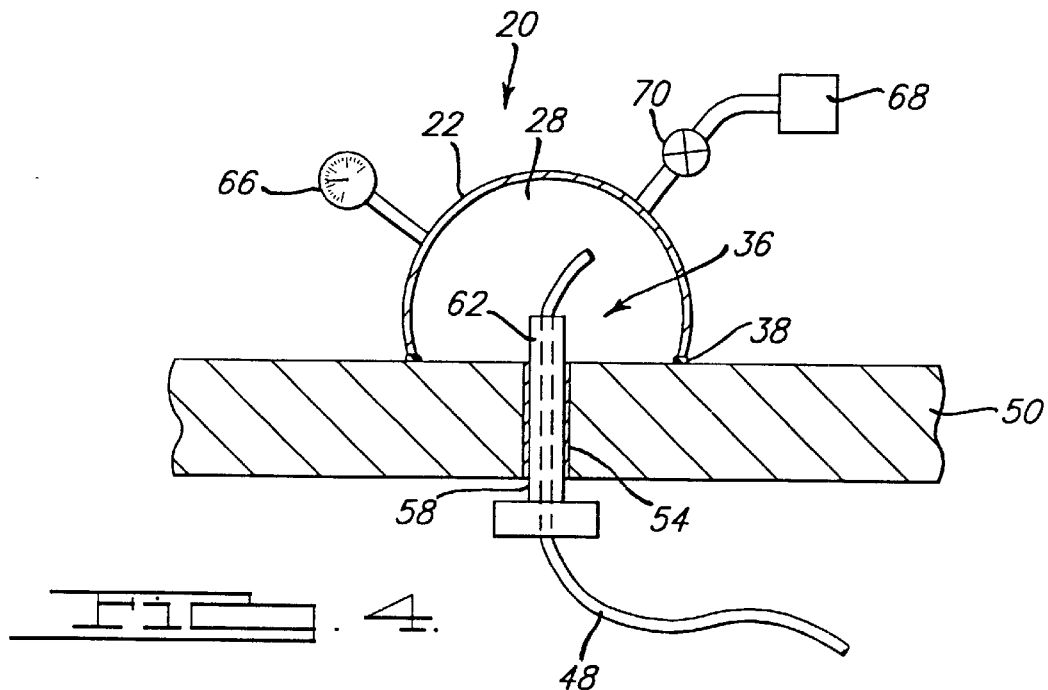
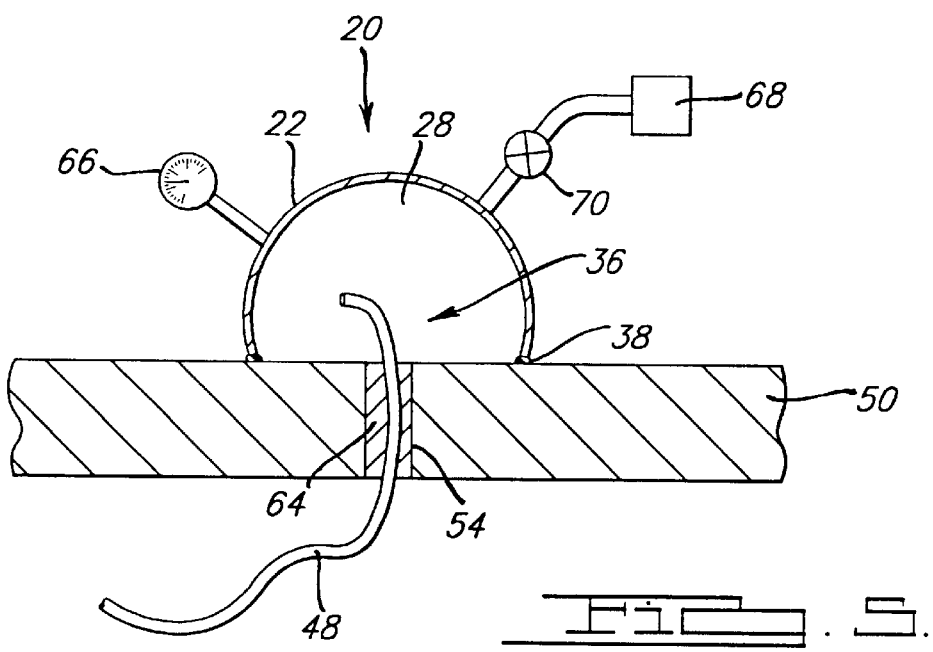

METHOD AND APPARATUS TO LOCALLY TEST PRESSURE SEAL

FIELD OF THE INVENTION

The present invention relates to tools for use on an aircraft, and more particularly, to tools for localized testing of pressure seals on an aircraft.

BACKGROUND OF THE INVENTION

Aircraft typically have pressurized cabins that maintain the pressure inside the cabin at a level higher than the atmospheric pressure outside the aircraft during flight. In order to maintain the integrity of the pressurized cabin, openings made in the cabin during the maintenance, and/or upgrade of the aircraft must be sealed and tested. For example, when it is desired to place a new antenna on the exterior of the aircraft, a hole in the fuselage will be required to allow cables or wires to be attached to the antenna. The hole or opening created to allow the cables to travel from inside the aircraft to the exterior of the aircraft need to be sealed prior to putting the aircraft into service. The pressure seals must be able to withstand the pressure differential between the pressurized cabin and the atmospheric pressure when the aircraft is in flight. Therefore, the integrity of the pressure seals must be tested prior to putting the aircraft into service.

The requirements for sealing the openings in the aircraft and the subsequent testing of the pressure seals is typically regulated by a government agency, such as the Federal Aviation Administration (FAA) and/or the airframe manufacturer. These agencies create standards for testing the integrity of the pressure seals used on the aircraft.

In order to test the new pressure seals, the entire cabin is pressurized to a predetermined pressure as specified by the government regulation and/or airframe manufacturer recommendation and held at that pressure for a predetermined length of time to check the integrity of the seal and ensure the safe operation of the aircraft. The process required to pressurize the cabin is time and labor intensive. Typically, repairs and modifications to aircraft are performed inside a hangar where pressure testing cannot be performed without special safety equipment. When it is time to pressure test the aircraft, the aircraft is usually moved to a remote location where it is safe to pressurize the cabin and test the integrity of the pressure seals. In order to move the aircraft to an appropriate pressure testing location, a cockpit-qualified mechanic or pilot is required to move the aircraft. Additionally, ground support, such as a marshalling group or using a walking group, will also be necessary to ensure that the aircraft does not hit anything on its way from the hangar to the pressure testing location. Furthermore, fire protection safe guards are required to be in place which includes having a dedicated fire safety personnel on site during the testing procedure. Therefore, a large amount of labor is required to prepare the aircraft for pressure testing. Because the pressure testing is accomplished via the cabin pressure controller, the aircraft engines need to be operated along with the auxiliary power unit. The operation of the aircraft engines and the auxiliary power unit results in the use of fuel and electricity which increases the cost of pressure testing.

Therefore, it is desirable to be able to test the integrity of the new pressure seals without the need to pressurize the entire cabin. Additionally, if the integrity of the pressure seals can be tested without pressurizing the entire cabin the need to move the aircraft to an authorized pressure testing area can be eliminated. This will result in a savings in labor, fuel and energy costs associated with the pressurized testing of the entire cabin. Therefore, what is needed is a way to locally pressure test the integrity of the new pressure seals without the need to pressurize the entire cabin.

SUMMARY OF THE INVENTION

The present invention is directed to a method and apparatus to locally test the integrity of a pressure seal, in accordance with preferred embodiments of the present invention. In one preferred embodiment, a tool is used to locally test the integrity of the pressure seal. The tool has a body with an exterior surface and an interior cavity. A peripheral edge on the body defines an opening that leads to the interior cavity of the body. The body is configured and adapted to withstand a vacuum in the interior cavity without the body of the tool collapsing or buckling. A sealing member is positioned along the peripheral edge. The sealing member provides a fluid tight seal between the peripheral edge of the body and an aircraft on which the tool is being used. The tool is positioned on the aircraft so that the opening in the body of the tool surrounds the pressure seal that is to be tested. The sealing member allows the interior cavity of the body to communicate with the aircraft and the pressure seal so that when a vacuum is created in the interior cavity of the tool the pressure seal also experiences the vacuum. A predetermined level of vacuum is then created in the interior cavity of the tool. After a predetermined length of time as required by the applicable government regulations the level of vacuum in the interior cavity is observed so that the integrity of the pressure seal can be determined.

In another preferred embodiment, the tool also has a vacuum source attached to the body of the tool. The vacuum in the interior cavity of the tool is then provided by selectively operating the vacuum source so that the vacuum source pulls the vacuum on the interior cavity of the tool. The vacuum is then observed after the predetermined length of time to ensure the integrity of the pressure seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows an exploded view of the tool of the present invention;

FIG. 2 shows the tool of FIG. 1 being used to test a pressure seal on a fuselage of an aircraft;

FIG. 3 shows a cross sectional view of a tool of the present invention being used to pressure test the integrity of the pressure seal on an aircraft fuselage;

FIG. 4 shows a cross sectional view of the tool of FIG. 1 being used to pressure test the integrity of a pressure seal on a fuselage of an aircraft; and FIG. 5 shows a cross sectional view of the tool of FIG. 1 being used to pressure test the integrity of a different pressure seal on a fuselage of an aircraft.

DETAILED DESCRIPTION OF THE PREFERRED EMBODIMENTS

The following description of the preferred embodiments is merely exemplary in nature and is in no way intended to limit the invention, its application, or uses.

Referring to FIG. 1, there is shown a tool 20 in accordance with a preferred embodiment of the present invention for locally testing the integrity of the pressure seal on an aircraft. The tool 20 comprises a body 22 which has an exterior surface 24 and an interior cavity 26. The body 22 has an opening 28 that is defined by a peripheral edge 30. The opening 28 allows access to the interior cavity 26 of the tool 20. The body 22 is designed to be able to withstand a vacuum being placed on the interior cavity 26 of the tool 20 without the body 22 collapsing or buckling under the strain of the vacuum. Preferably, the exterior surface 24 of the body 22 is spherical in shape so that the body can more easily withstand the stresses associated with a vacuum in the interior cavity 26. However, it should be understood that a variety of shapes for the exterior surface 24 of the body 22 can be employed without departing from the scope of the invention as defined by the claims. Also preferably, the opening 28 and the peripheral edge 30 are contoured to be complementary to a contour of the aircraft 34 at the location of the pressure seal 36.

The tool 20 also comprises a sealing member 32 that is designed to provide a fluid tight seal between the tool 20 and an aircraft 34 so that a pressure seal 36 on the aircraft 34 can be locally tested by a vacuum being placed within the interior cavity 26 of the tool 20. The sealing member 32 can be provided by a variety of means. For example, the sealing member 32 can be in the form of a putty type substance that can be applied to the peripheral edge 30 to form a fluid tight seal between the aircraft 34 and the tool 20. The sealing member 22 could also be a viscid substance that can be applied to the peripheral edge 30 to provide a fluid tight seal between the aircraft 34 and the tool 20. Preferably, as shown in FIG. 1, the sealing member 32 is a gasket 38. The gasket 38 has opposite first and second sealing surfaces 40, 42 and a thickness 44 therebetween. The gasket first sealing surface 40 forms a fluid tight seal between the gasket 38 and the peripheral edge 30. Preferably, the gasket 38 is contoured so that the first sealing surface 40 is complementary to and/or matches the peripheral edge 30 of the tool 20. The gasket 38 also has an opening 46 that extends through the gasket 38 and is generally aligned with the opening 28 in the body 22 of the tool 20 when placed on the peripheral edge 30 so that when the tool 20 is placed on the aircraft 34 over the pressure seal 36 the gasket 38 does not interfere with the communication between the interior cavity 26 and the pressure seal 36.

The second sealing surface 42 of the gasket 38 is designed to provide a fluid tight seal between the gasket 38 and the aircraft 34. In this manner, the gasket 38 provides a fluid tight seal between the aircraft 34 and the tool 20 so that the integrity of the pressure seal 36 can be tested by pulling a vacuum in the interior cavity 26. Preferably, the second sealing surface 42 of the gasket 38 is contoured to be complementary to and/or match the contour of the aircraft 34 at the location where the pressure seal 36 is located on the aircraft 34.

Preferably, the gasket 38 is made from a compressible material, such as rubber so that a fluid tight seal can be easily attained between the aircraft 34 and the tool 20. Even more preferably, the gasket is a fluorosilcone gel sandwich gasket such as those sold by AVDEC of Fort Worth, Tex. or TA Manufacturing of Seattle, Wash.

As can be seen in FIGS. 3–5, the pressure seal 36 to be tested comes in various forms. The form of the pressure seal 36 to be tested can vary based on what is being sealed. For example, when it is desired to run a cable 48 through the fuselage 50 of an aircraft 34 the type of pressure seal 36 will vary depending on the size of the cable 48. For example, as shown in FIG. 4, when the cable 48 is one half inch or less in diameter a pressure feed through 52 is typically put through the hole 54 in the fuselage 50. The pressure feed through 52 has a central opening 56 that extends through the length of the pressure feed through 52. The pressure feed through 52 also has an exterior surface 58 that extends through the hole 54 in the fuselage 50. When a pressure feed through 52 is utilized, the exterior surface 58 of the pressure feed through 52, as shown in FIG. 3, must be sealed to the hole 54 in the fuselage 50 so that the aircraft 34 can be pressurized. Typically, a sealant 60 is applied in the hole 54 between the exterior surface 58 of the pressure feed through 52 and the hole 54. The sealant 60 forms a fluid tight seal between the hole 54 and the exterior surface 58 of the pressure feed through 52. The sealant 60 is allowed to cure prior to being tested. The testing of the pressure seal 36 formed by the sealant 60 will be described in detail below.

After the integrity of the sealant 60 has been tested, the cable 48 is inserted through the opening 56 in the pressure feed through 52 and a sealant 62 is applied between the cable 48 and the opening 56 in the pressure feed through 52 so that the sealant 62 forms a fluid tight seal between the cable 48 and the opening 56 in the pressure feed through 52. The sealant 62 is allowed to cure and the integrity of the pressure seal 36 created by the sealant 62 is then tested as will be described in detail below.

When the cable 48 is larger than one half inch in diameter, as shown in FIG. 5, a pressure feed through 52 is typically not utilized. In this situation, the cable 48 is inserted through the hole 54 in the fuselage 50 and a sealant 64 is put in the hole 54 to provide a fluid tight seal between the cable 48 and the hole 54. The integrity of the pressure seal 36 formed by the sealant 64 is tested using the tool 20 as will be described in detail below.

The sealants 60, 62, 64 used to create the pressure seals between the cable 48, the hole 54 and/or the pressure feed through 52 is typically a polysulfide adhesive sealant. However, other adhesive sealants that are capable of forming a fluid tight seal can be used. The sealant 60, 62, 64 typically cures in two to three days but can be accelerated via a chemical accelerator or a heat lamp so that the sealant 60, 62, 64 can cure in one to two days.

Preferably, the tool 20 also comprises a vacuum gauge 66 which is attached to the body 22 of the tool 20. The vacuum gauge 66 communicates with the interior cavity 26 so that the level of vacuum in the interior cavity 26 can be observed by reading the vacuum gauge 66.

A vacuum source 68 is used to create a vacuum in the interior cavity 26 of the tool 20 so that the integrity of the pressure seal 36 can be determined. The vacuum source 68, as shown in FIG. 4, can be attached to the body 22 of the tool 20. The vacuum source 68 communicates with the interior cavity 26 of the tool 20 so that the vacuum source 68 can create a vacuum in the interior cavity 26. The vacuum source 68 can be selectively turned on and off. A valve 70 is positioned between the vacuum source 68 and the body 22 so that once the desired level of vacuum is attained in the interior cavity 26 the valve 48 can be closed and the integrity of the pressure seal 36 can be determined, as will be discussed in detail below. The valve 70 can be selectively opened and closed to either allow or prevent a vacuum source 68 from communicating with the interior cavity 26 of the tool 20.

Depending upon the type of pressure seal 36 to be tested, the vacuum source 68, as shown in FIG. 3, can be attached to the pressure feed through 52 via a hose 72. The hose 72 allows the vacuum source 68 to communicate with the interior cavity 26 of the tool 20 through the opening 56 in the pressure feed through 52. In this situation, the valve 70 is positioned in the hose 72 between the vacuum source 68 and the pressure feed through 52 so that the valve 70 can be selectively opened and closed to allow/prevent communication between the vacuum source 68 and the interior cavity 26.

In general, when using the tool 20 to locally test the integrity of the pressure seal 36, the tool 20 is positioned on the aircraft 34 so that the gasket 38 is between the aircraft 34 and the peripheral edge 30 of the tool 20 and the gasket opening 46 is generally aligned with the opening 28 in the body 22 of the tool 20 and surrounds the pressure seal 36 on the aircraft 34 so that the interior cavity 26 communicates with the pressure seal 36. A vacuum is created in the interior cavity 26 by the vacuum source 68 to a predetermined level as directed by the government regulations and/or airframe manufacturer recommendations. The level of vacuum in the interior cavity 26 can be read on the vacuum gauge 66. When the desired level of vacuum is attained the valve 70 is closed so that the vacuum source 68 is no longer pulling a vacuum on the interior cavity 26 and the test of the pressure seal 36 can begin. If the pressure seal 36 is working properly, the level of vacuum in the interior cavity 26 should remain constant. After a predetermined length of time, as specified by the government regulations and/or airframe manufacturer recommendations, the reading on the vacuum gauge 66 of the level of vacuum in the interior cavity 26 is observed. If the vacuum reading from the beginning of the test to the end of the test has changed by less than a predetermined amount as specified by the applicable government regulations and/or airframe manufacturer recommendations then the integrity of the pressure seal 36 has been verified. The aircraft 34 can then be safely put into operation. If the level of vacuum in the interior cavity 26 changes by greater than the predetermined amount then the pressure seal 36 has failed the test and the pressure seal 36 must be repaired and re-tested before the aircraft 34 can be safely put into operation.

Referring now to FIG. 3, when a pressure feed through 52 is utilized in the hole 54 of the fuselage 50 the pressure seal 36 formed by the sealant 60 is tested prior to inserting the cable 48 through the opening 56 of the pressure feed through 52. The tool 20 is positioned on the aircraft 34 as was described above so that the interior cavity 26 communicates with the pressure seal 36. In this situation, the vacuum source 68 can be connected either to the body 22 of the tool 20 or, as shown in FIG. 3, to the opening 56 in the pressure feed through 52. When connecting the vacuum source 68 to the opening 56 in the pressure feed through 52 a hose 66 is utilized to connect the vacuum source 68 to the opening 56. The hose 66 is configured to provide a fluid tight engagement with the opening 56 in the pressure feed through 52 so that the connection between the hose 66 and the pressure feed through 52 is not a source of leaks that effect the integrity of the testing of the pressure seal 36. The vacuum source 68 then communicates with the interior cavity 26 of the tool 20 and is used to pull a vacuum in the interior cavity 26. Once the desired level of vacuum in the interior cavity 26 is attained the valve 70 is closed so the vacuum source 68 no longer communicates with the interior cavity 26 and the integrity of the pressure seal 36 formed by the sealant 60 can be tested. As was described above, after a predetermined length of time the amount of vacuum in the interior cavity 26 is observed and the integrity of the pressure seal 36 formed by the sealant 60 is determined. If the pressure seal 36 fails the test then the source of the failure is searched for and when corrected the pressure seal 36 is re-tested. While the testing of the pressure seal 36 between the exterior surface 58 of the pressure feed through 52 formed by the sealant 60 has been described with reference to attaching a vacuum source 68 to the opening 56 in the pressure feed through 52 it should be understood that a plug (not shown) that is capable of forming a fluid tight seal can be inserted in the opening 56 in the pressure feed through 52 and the vacuum source 68 can be connected to the body 22 of the tool 20 to create a vacuum in interior cavity 26, as will be discussed in detail below, without departing from the scope of the invention as defined by the claims.

As can be seen in FIG. 4, if the pressure seal 36 formed by the sealant 60 passes the test, then the cable 48 can be inserted through the opening 56 in the pressure feed through 52. The sealant 62 is then applied to the opening 56 in the pressure feed through 52 so that the sealant 62 forms a pressure seal 36 between the pressure feed through 52 and the cable 48. Once the sealant 62 has cured the integrity of the pressure seal 36 formed by the sealant 62 is tested. In this situation, the cable 48 prevents the vacuum source 68 from being connected to the opening 56 in the pressure feed through 52. The vacuum source 68 is connected via a hose 66 to the valve 70 which is attached to the body 22 of the tool 20 and communicates with the interior cavity 26 so that when the valve 70 is open the vacuum source 68 communicates with the interior cavity 26. The vacuum source 68 can then create a vacuum in the interior cavity 26. When the predetermined level of vacuum is attained in the interior cavity 26 as observed on the vacuum gauge 66 the valve 70 is closed so that the vacuum source 68 no longer communicates with the interior cavity 26 and the tool 20 forms a fluid tight seal with the aircraft 34. After the predetermined length of time the amount of vacuum in the interior cavity 26 is observed on the vacuum gauge 66 and the integrity of the pressure seal 36 formed by the sealant 62 is determined.

As can be seen in FIG. 5, when a pressure feed through 52 is not used in the hole 54, the integrity of the pressure seal 36 formed by the sealant 64 can be tested in the same manner that the pressure seal 36 between the cable 48 and the opening 56 in the pressure feed through 52 formed by the sealant 62 was conducted as discussed above. In this manner, the tool 20 provides the capability of testing the multiple pressure seals 36 that are typically encountered by sealing a hole 54 in the fuselage 50 of an aircraft 34 in which a cable 48 is desired to be inserted. Furthermore, the tool 20 allows for localized testing of the pressure seal 36 without the need to pressurize the cabin of the aircraft 34 and without incurring the costs associated with the pressurizing of the cabin.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A tool for locally testing a pressure seal on an aircraft, the tool comprising:

a body having an exterior surface, an interior cavity and a peripheral edge that defines an opening in the body that communicates with the interior cavity, the body being configured and adapted to withstand a vacuum created and held in the interior cavity without the body collapsing and the body being configured to allow an exterior portion of a feed through passing through an opening in a fuselage of an aircraft to fit within the interior cavity;

a sealing member, the sealing member providing a fluid tight seal between the peripheral edge and the aircraft so that a vacuum can be created in the interior cavity, the sealing member allowing the interior cavity to communicate with a pressure seal that seals the feed through to the opening in the fuselage on the aircraft; and a vacuum source connected to an interior portion of the feed through and communicating with the interior cavity so that a vacuum can be created in the interior cavity.

2. The tool of claim 1, wherein the body is generally spherical.

3. The tool of claim 1, wherein the peripheral edge is contoured to be complementary to a contour of the aircraft at a location on the aircraft where the pressure seal to be tested is located.

4. The tool of claim 3, wherein the sealing member is contoured to be complementary to both the contour of the peripheral edge and to the contour of the aircraft at the location of the pressure seal.

5. The tool of claim 1, wherein a vacuum gauge is attached to the body and measures the vacuum in the interior cavity.

6. The tool of claim 1, wherein the sealing member is a gasket.

7. The tool of claim 6, wherein the gasket has opposite first and second sealing surfaces and the first sealing surface is complementary to a contour of the peripheral edge and the second sealing surface is complementary to a contour of the aircraft at a location on the aircraft at which the tool is to be used.

8. A method of locally testing a pressure seal on an aircraft, the method comprising the steps of:

providing an aircraft having a pressure seal around a feed through passing through an opening in a fuselage of the aircraft which needs to be tested;

providing a tool having a body with an interior cavity and an opening that allows access to the interior cavity;

providing a sealing member;

positioning the tool on the aircraft with the tool opening surrounding the pressure seal and with the sealing member positioned between the tool and the aircraft so that the interior cavity communicates with the pressure seal and a fluid tight seal is formed between the tool and the aircraft;

creating a vacuum of a predetermined level in the interior cavity of the tool with a vacuum source connected to an interior portion of the feed through so that the pressure seal experiences the vacuum; and observing the level of vacuum in the interior cavity after a predetermined length time.

9. The method of claim 8, wherein:

the step of providing a sealing member comprises providing a gasket having an opening therethrough; and the step of positioning the tool on the aircraft further comprises positioning the tool on the aircraft with the tool opening surrounding the pressure seal and with the gasket positioned between the tool and the aircraft with the gasket opening generally aligned with the opening in the tool body so that the interior cavity communicates with the pressure seal and a fluid tight seal is formed between the tool and the aircraft.

10. The method of claim 9, wherein:

the step of providing a gasket further comprises providing a gasket with opposite first and second sealing surfaces with the first sealing surface being contoured to be complementary to a contour of the opening in the tool body and the second sealing surface being contoured to be complementary to a contour of the aircraft at the location of the pressure seal; and the step of positioning the tool on the aircraft further comprises positioning the tool on the aircraft with the gasket first sealing surface being in contact with the opening in the tool and the gasket second sealing surface being in contact with the aircraft.

11. The method of claim 8, wherein the step of providing a tool further comprises providing the tool with a body that is generally spherically shaped.

12. The method of claim 8, wherein the step of providing a tool further comprises providing the tool with an opening that is contoured to be complementary to a contour of the aircraft at a location of the pressure seal.

13. The method of claim 8, further comprising the step of providing a vacuum gauge that communicates with the interior cavity of the tool so that the vacuum in the interior cavity can be measured.

* * * * *